United States Patent
Moore

(10) Patent No.: US 6,637,989 B1
(45) Date of Patent: Oct. 28, 2003

(54) CENTER LOCATING FEATURE IN DRILL BIT FORMED WITHOUT A POINTED TIP

(75) Inventor: Richard A. Moore, Newport, OR (US)

(73) Assignee: Bitmoore, Salem, OR (US)

( * ) Notice: Subject to any disclaimer, the term of this patent is extended or adjusted under 35 U.S.C. 154(b) by 0 days.

(21) Appl. No.: 10/069,706

(22) PCT Filed: Aug. 25, 2000

(86) PCT No.: PCT/US00/23508

§ 371 (c)(1),
(2), (4) Date: Feb. 26, 2002

(87) PCT Pub. No.: WO01/15844

PCT Pub. Date: Mar. 8, 2001

Related U.S. Application Data

(60) Provisional application No. 60/152,148, filed on Aug. 31, 1999.

(51) Int. Cl.$^7$ ................................................ B23B 51/00
(52) U.S. Cl. ....................................... 408/119; 408/229
(58) Field of Search ................................ 408/229, 230, 408/228, 211, 199, 204, 223, 68, 79, 80, 82, 201, 225

(56) References Cited

U.S. PATENT DOCUMENTS

| | | | | |
|---|---|---|---|---|
| 2,188,928 A | * | 2/1940 | Stolle | 408/211 |
| 3,260,139 A | * | 7/1966 | Sanborn | 408/211 |
| 3,361,014 A | * | 1/1968 | McClennan | 408/199 |
| 3,400,617 A | * | 9/1968 | Sanborn | 408/223 |
| 4,072,438 A | * | 2/1978 | Powers | 408/59 |
| 4,395,169 A | * | 7/1983 | Kashiwagi et al. | 408/59 |
| 5,066,170 A | * | 11/1991 | Berryer | 407/54 |
| 5,149,234 A | * | 9/1992 | Durfee, Jr. | 408/211 |
| 5,443,585 A | * | 8/1995 | Kawase et al. | 408/199 |
| 5,823,720 A | | 10/1998 | Moore | 408/204 |
| 5,967,707 A | | 10/1999 | Larson | 408/1 R |

* cited by examiner

*Primary Examiner*—Steven C. Bishop
(74) *Attorney, Agent, or Firm*—Stoel Rives LLP

(57) ABSTRACT

A centering feature (230) on a drill bit (110) configured without a pointed tip, formed as an opening (230) between first (206) and second (208) relatively angularly inclined portions of a work engaging end (116) of the drill bit (110). The first portion (206) of the work engaging end (116) is defined by a cutting edge (134), and the second portion (208) is defined by an end face side boundary (216) transversely aligned with the cutting edge (134). The cutting edge (134) and end face side boundary (216) are offset from each other to create the opening (230), which permits the drill operator to view a punch mark or other indication on the work piece where the center (232) of the intended hole is to be located. The drill operator positions the medial termination point (212) of the cutting edge (134) of the drill bit (110) over the center hole location (232) preparatory to contacting the drill bit (110) against the work piece to cut the hole.

11 Claims, 5 Drawing Sheets

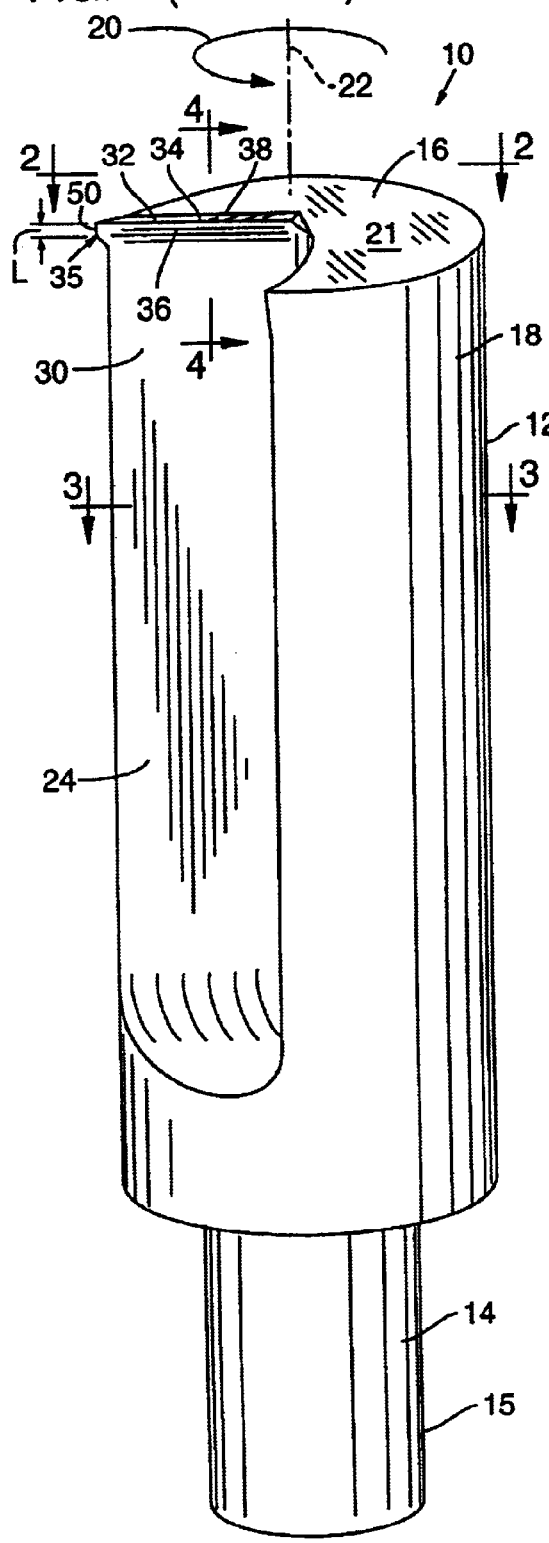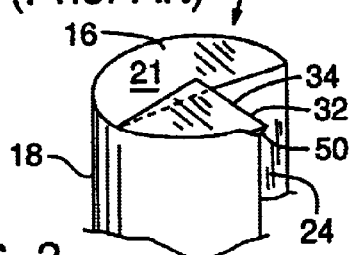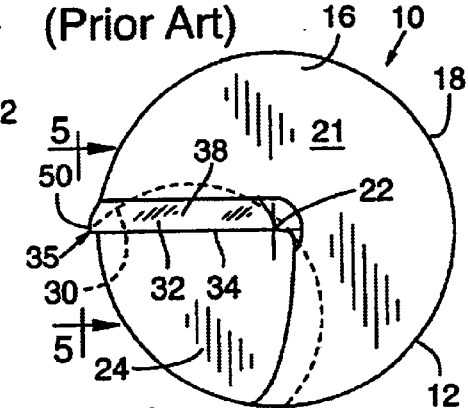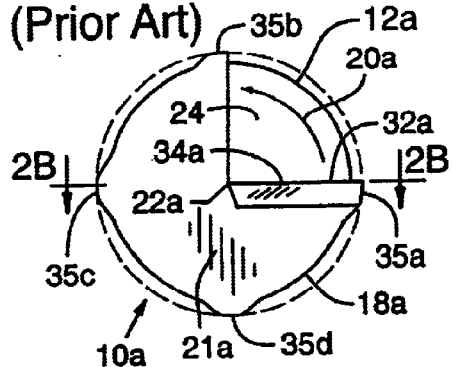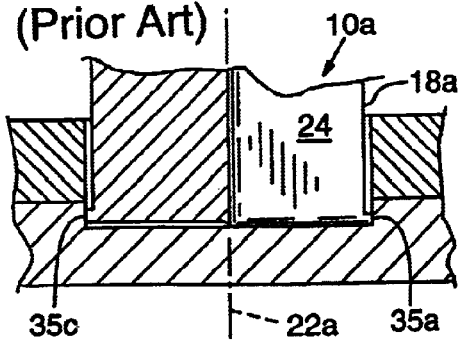
FIG. 1 (Prior Art)
FIG. 1A (Prior Art)
FIG. 2 (Prior Art)
FIG. 2A (Prior Art)
FIG. 2B (Prior Art)

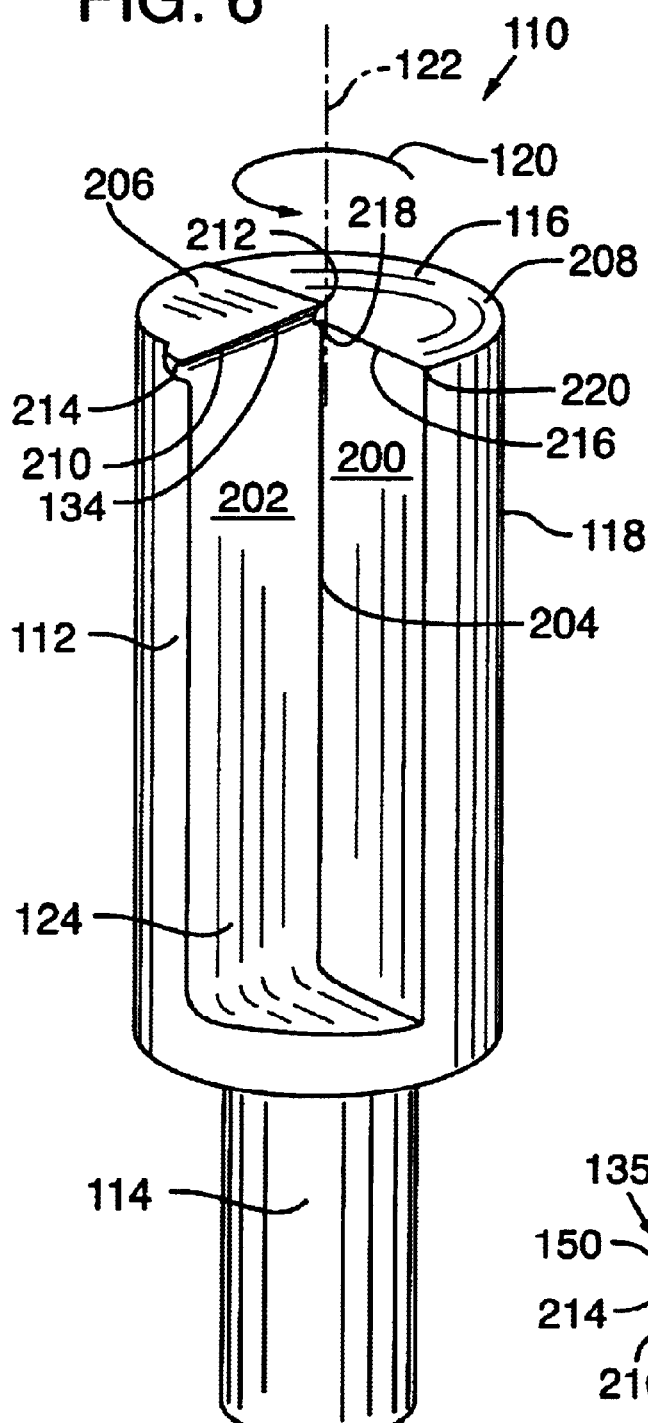
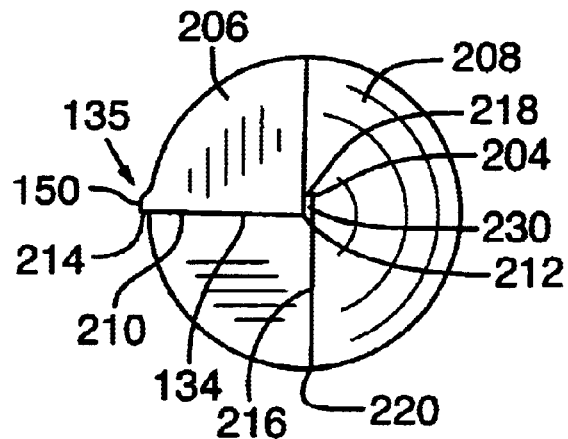

CENTER LOCATING FEATURE IN DRILL BIT FORMED WITHOUT A POINTED TIP

RELATED APPLICATIONS

This application is a 371 of International Application No. PCT/US00/23508, filed Aug. 25, 2000, which claims benefit of U.S. Provisional Patent Application No. 60/152,148, filed Aug. 31, 1999.

TECHNICAL FIELD

This invention relates to improvements in cutting tools and, in particular, to a cutting tool with an opening that facilitates accurate positioning of the axis of rotation of a cutting tool drilling a hole in a work piece.

BACKGROUND OF THE INVENTION

Conventional tools, such as drill bits, for cutting holes in a work piece have pointed tips that position the axes of rotation of the drill bits at the locations of the centers of the holes to be drilled. However, a drill bit with a pointed tip and no means to ensure lateral stability tends to wander as the drill bit finds the center of the hole and thereby exerts a lateral force against its side wall. The result is a drilled hole of nonuniform diameter along its length, which prohibits a drill operator from drilling a pair of side-by-side holes with a thin partition between them. Drill bits of the type described in U.S. Pat. No. 5,832,720 do not suffer from lateral instability and are, therefore, capable of drilling dimensionally accurate, smooth-sided holes in work pieces.

FIGS. 1–5 show several views of a prior art cutting tool described in U.S. Pat. No. 5,832,720, in which a circular hole drill bit 10 comprises a cylindrical body 12 having a driver engaging end 14 opposite a work engaging end 16. A substantially cylindrical side wall 18 extends between driver engaging end 14 and work engaging end 16. Body 12 is adapted to be rotated about an axis of rotation 22 relative to a work piece in a predetermined direction indicated by a counterclockwise pointing arrow 20 when working. Work engaging end 16 may comprise a work end face 21 that is substantially flat (FIG. 1) or stepped (FIG. 1A) at work engaging end 16. Body 12 is formed with an elongate flute 24 in side wall 18, extending from work end face 21 towards driver engaging end 14 in a direction generally parallel to axis of rotation 22. At work end face 21, flute 24 has a minimum depth that is equal to the radius R of shaft 12. Flute 24 has a trailing face 30 with respect to direction 20 of rotation of bit 10 when rotated in its work direction. (FIG. 1A shows a flute 24 having a sharp corner at the step formation of face 21.)

Formed on work engaging end 16 of drill bit 10 is a cutting tooth 32 that is configured to have a cutting edge 34 and a guide projection 35 that extends laterally of side wall 18. Cutting edge 34 extends from axis 22 and along the portion of guide projection 35 nearer to work engaging end 16. Cutting edge 34 is also positioned above end face 21 as shown in FIGS. 1 and 4, so that cutting edge 34 may engage the work piece when drill bit 10 is rotated. Cutting edge 34 may extend perpendicularly to axis of rotation 22, in which instance cutting edge 34 terminates at axis 22, or cutting edge 34 may be inclined upwardly as is shown in FIG. 1 from axis 22 toward side wall 18, in which instance cutting edge 34 can extend beyond axis 22. In this latter instance, relief is provided on end face 21 at axis 22 so that the portion of cutting edge 34 extending beyond axis 22 does not counteract the hole cutting operation, as shown in FIGS. 1 and 2.

Guide projection 35 is formed with a guide face 50 that is concentric with axis 22 and intersects cutting edge 34 to form a sharp corner. Guide face 50 is spaced from axis 22 by an amount greater than the spacing of any other part of body 12, so that in rotation of drill bit 10 no portion of body 12 will engage the side wall of the hole formed in the work piece by drill bit 10. As a practical matter, the spacing should be slightly greater than the eccentricity, colloquially known as "slop," in the rotation of the chuck holding the drill bit, which eccentricity results from slack in the mounting of the chuck in the driving mechanism. The guide projection distance from side wall 18 is also determined by the properties of the drill bit material—the harder the drill bit material, the greater the possible guide projection distance without flexure of drill bit 10. Normally the guide projection distance from side wall 18 in a drill bit of 1 to 1¼ inches (2.5–3.2 centimeters) in diameter will be between about 0.001–0.250 inch (0.025–6.4 millimeters).

In the direction parallel to axis 22, guide face 50 preferably has a minimum length, L, equal to the depth of the cut made by cutting edge 34 in about one and one-half revolutions of the drill bit. This may be from 0.001–0.500 inch (0.025–12.7 millimeters) depending on the material being cut. In the circumferential direction, guide face 50 preferably also has a length of no less than the depth of cut. Guide face 50 preferably is maintained at a minimum size so as to minimize the area of contact with the work piece, thereby minimizing the amount of heat generated to not appreciably increase the temperature of the finished surface and to keep drill bit 10 cool. Cutting tooth 32 rearwardly of guide face 50 is tapered inwardly toward side wall 18 leaving enough material to support guide projection 35. This inward taper provides for guide face 50 relief that prevents scoring of the finished surface of the work piece by side wall 18 as drill bit 10 advances into the work piece to remove material from it.

When drill bit 10 is to be used to cut through layers of a composite work piece of different degrees of solidity or hardness (e.g., fibrous material and solid material layers), the length L is preferably chosen to be longer than the depth of cut achievable by at least one revolution of drill bit 10 in each of two adjacent layers so that guide projection 35 concurrently contacts the two adjacent layers while cutting through the transition line between them. This is to ensure layer-to-layer overlap of guide projection 35 and thereby prevent deflection of the cutting path of drill bit 10 at the transition between adjacent work piece layers.

FIG. 2A is an end view of an alternative circular hole drill bit 10a, which differs from drill bit 10 in that drill bit 10a has multiple guide projections 35a, 35b, 35c, and 35d concentric with axis 22a with equal radii extending and uniformly spaced apart around the periphery of side wall 18a at work end face 21a to facilitate cutting through layers of a composite work piece of different degrees of solidity or hardness. Drill bit 10a rotates in direction 20a about axis 22a to cut a hole in the work piece. FIG. 2B is a fragmentary sectional view showing drill bit 10a cutting into a layer of a multiple-layer work piece. The formation of guide projections 35a, 35b, 35c, and 35d on side wall 18a is analogous to the formation of guide projection 35 on side wall 18, except as indicated below. Guide projections 35a, 35b, 35c, and 35d reduce the propensity of side wall 18a to flex laterally as drill bit 10a passes through a softer material to a harder material and thereby maintain a uniform hole diameter through the multiple layers of a work piece. Although FIG. 2A shows guide projections 35a, 35b, 35c, and 35d at 90 degree angularly displaced locations, the number and angular separation of the guide projections can be selected depending on the properties of a work piece that would induce body flexure of the drill bit.

When formed of ordinary tool steel, drill bit 10 is particularly suited for the drilling of holes in wood, soft metals, such as aluminum and brass, and plastics, such as delrin™ and nylon™, and other like materials. The hole drilled can have a flat bottom (depending on the inclination of cutting edge 34 from axis 22 to side wall 18), will have an exceptionally smooth side wall, and will be accurately dimensioned. If cutting tooth 32 is formed of a harder material, such as a carbide, drill bit 10 can be used in harder metals, glass, porcelain, and other hard materials.

The cutting tool formed as a drill bit without a pointed tip as taught in U.S. Pat. No. 5,832,720 removes material from a work piece while providing exceptionally smooth side surfaces of holes drilled in the work piece. The drill bit lacks, however, a centering feature for accurately positioning the tool on the work piece. A user of the drill bit centers it by either visually estimating the location on the work piece surface where the periphery of the hole is to be cut or lightly contacting the drill bit against the work piece to slightly scratch its surface to show an outline of the periphery of the hole to be cut. Thus, the performance of the drill bit taught in U.S. Pat. No. 5,832,720 could be improved by the addition of a feature that allows convenient centering of the drill bit on the work piece.

SUMMARY OF THE INVENTION

An object of the present invention is, therefore, to provide a centering feature on a drill bit configured without a pointed tip for removing material from a work piece to provide drilled holes with exceptionally smooth side surfaces.

The present invention is a drill bit of a type shown in FIG. 1 or 1A that is implemented with a centering feature formed as an opening between first and second relatively angularly inclined portions of a work engaging end of the drill bit. The drill bit has a cylindrical body bounded by the work engaging end and a driver engaging end. The first portion of the work engaging end is defined by a cutting edge, and the second portion is defined by an end face side boundary running in a direction transverse to that of the cutting edge. The cutting edge and end face side boundary are offset from each other to create an opening that facilitates centering the axis of rotation of the drill bit on a work piece at a spot that represents the center of a hole to be drilled.

In a preferred embodiment, the drill bit has an elongate flute that extends along the length of the drill bit from the work engaging end to a location nearer to the driver engaging end. The flute includes generally flat trailing and leading faces that intersect at about a 90 degree angle to form a boundary line extending along the length of the drill bit near its axis of rotation. The cutting edge is positioned at the top of the trailing face of the flute at the work-engaging end and terminates at a medial termination point coincident with the axis of rotation of the drill bit. The leading face of the flute is recessed from the axis of rotation of the drill bit to form an opening between the end face side boundary of the leading face and the medial termination point of the cutting edge.

The opening permits the drill operator to view a punch mark or other indication on the work piece where the center of the intended hole is to be located. The drill operator positions the medial termination point of the cutting edge of the drill bit over the hole center location preparatory to contacting the drill bit against the work piece to cut the hole.

Additional objects and advantages of this invention will be apparent from the following detailed description of a preferred embodiment thereof, which proceeds with reference to the accompanying drawings.

BRIEF DESCRIPTION OF THE DRAWINGS

FIG. 1 is a perspective view of the prior art drill bit;

FIG. 1A shows a work engaging end of the prior art drill bit of FIG. 1 that is modified to have a stepped end face and angled flute;

FIG. 2 is a plan view looking in the direction of the arrows 2—2 of FIG. 1;

FIG. 2A is an end view of a modified version of the prior art drill bit of FIG. 1 having multiple guide projections spaced around the periphery of the work end face of the drill bit body;

FIG. 2B is a fragmentary sectional view taken along lines 2B—2B of FIG. 2A showing the drill bit cutting a hole in a multilayer work piece;

FIG. 6 is a perspective view of a drill bit having a center locator feature in accordance with the invention;

FIG. 7 is a top plan view of the drill bit of FIG. 6;

DETAILED DESCRIPTION OF A PREFERRED EMBODIMENT

Figure 3:
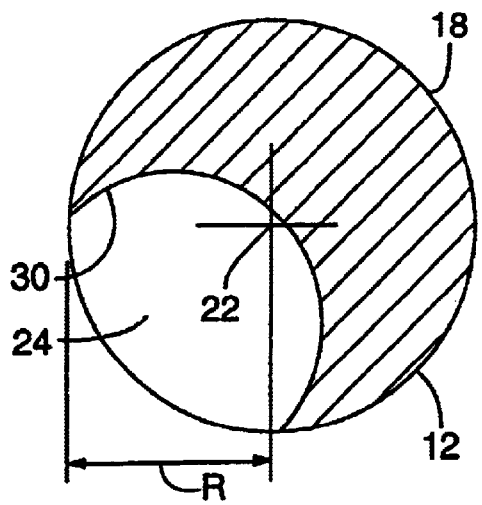
FIG. 3 is a sectional view along lines 3—3 of FIG. 1.
Figure 4:
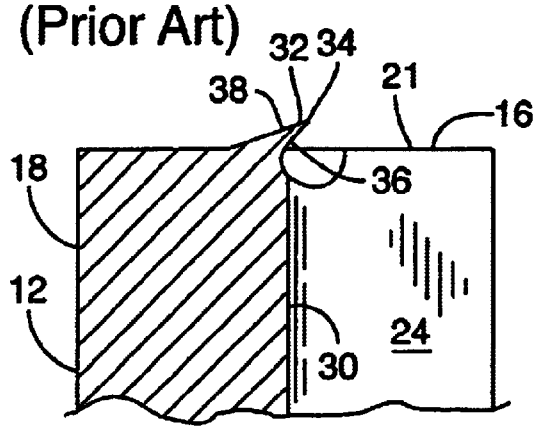
FIG. 4 is a fragmentary sectional view along lines 4—4 of FIG. 1.
Figure 5:
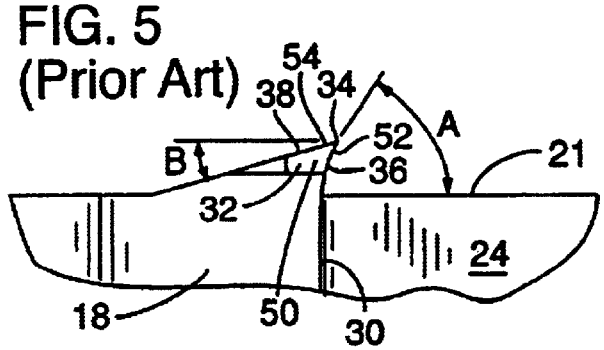
FIG. 5 is an enlarged fragmentary view looking in the direction of the arrows 5—5 of FIG. 2.

FIGS. 6–9 show the center locating feature of the present invention implemented in a preferred circular hole drill bit 110 having a stepped work engaging end 116 similar to that of drill bit 10 shown in FIG. 1A. With reference to FIGS. 6–9, drill bit 110 with a center locator includes a cylindrical body 112 that is defined by a driver engaging end 114 and work engaging end 116 between which extends a substantially cylindrical side wall 118 formed with an elongate flute 124. Flute 124 is in the form of a wedge having respective generally flat leading and trailing faces 200 and 202 intersecting at about a 90 degree angle to form within body 112 a corner that defines a boundary line 204 extending parallel to an axis of rotation 122. Body 112 is adapted to be rotated relative to a work piece in a predetermined direction indicated by a pointed arrow 120 when working. Drill bit 110 includes a guide projection 135 having a guide face 150 as described above with reference to guide projection 35 and guide face 50 of drill bit 10.

Work engaging end 116 is defined by a first portion 206 that is angularly inclined with a positive slope relative to, and has about one-half the surface area of, a second portion 208. First portion 206 has a first side boundary 210 that is defined by a cutting edge 134 extending in a direction transverse to axis of rotation 122. First side boundary 210 represents the work-engaging end boundary of trailing face 202 of flute 124. First side boundary 210 terminates at a medial end 212 of cutting edge 134 coincident to axis of rotation 122 and a distal end 214 along cutting edge 134 located near side wall 118 of body 112. Second portion 208 has a second side boundary 216 running in a direction that is transversely aligned with the direction of the length of cutting edge 134. Second side boundary 216 represents the work-engaging end boundary of leading face 200 of flute 124. Second side boundary 216 terminates at a medial end 218 near axis of rotation 122 and at a distal end 220 near side wall 118 of body 112.

Figure 8:
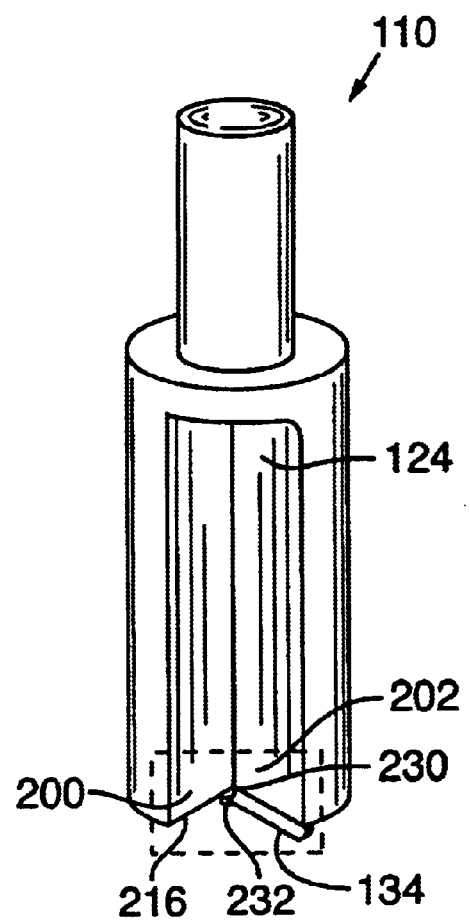
FIG. 8 is a perspective view of the drill bit of FIG. 6 showing its work engaging end operatively positioned so that the axis of rotation of the drill bit is aligned with a desired hole center point.
Figure 9:
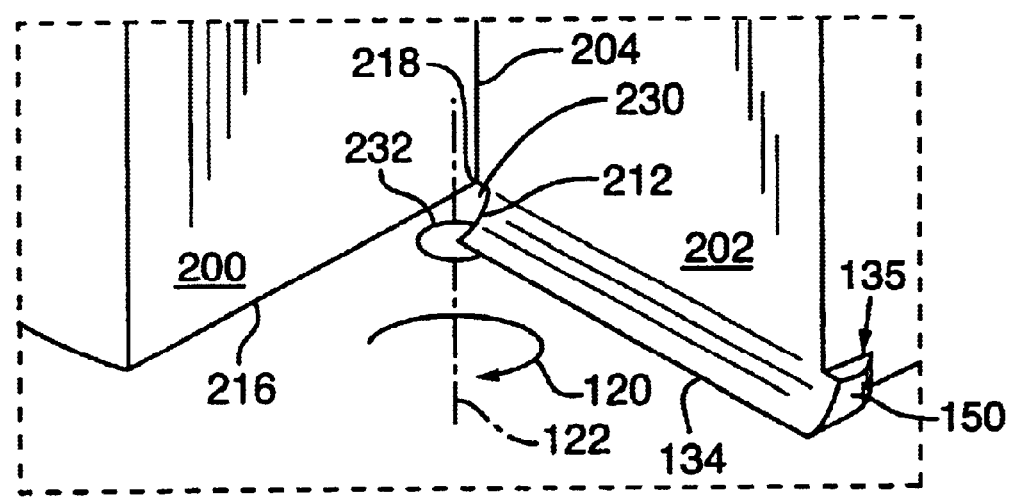
FIG. 9 is an enlarged view of the area confined within the rectangular box drawn around the work engaging end of the drill bit of FIG. 8 and shows the alignment of the axis of rotation of the drill bit and hole center point mark on the work piece.

With particular reference to FIGS. 7–9, an offset distance between medial end 212 of cutting edge 134 and second side boundary 216 near its medial end 218 creates an opening 230 that provides a center locating feature. Center locator opening 230 allows a drill operator to align with axis of rotation 122 of drill bit 110 a desired hole center point 232 marked on a work piece surface. As shown in FIGS. 8 and 9, the drill operator aligns hole center point 232 and drill bit axis of rotation 122 by first marking hole center point 232 on the work piece surface, looking through center locator opening 230, and aligning drill bit 110 medial end 212 of cutting edge 134 with center point 232. Drill bit 110 is then rotated in predetermined direction 120 about axis of rotation 122 to open a centered, accurately dimensioned hole with an exceptionally smooth side wall.

Figure 10:
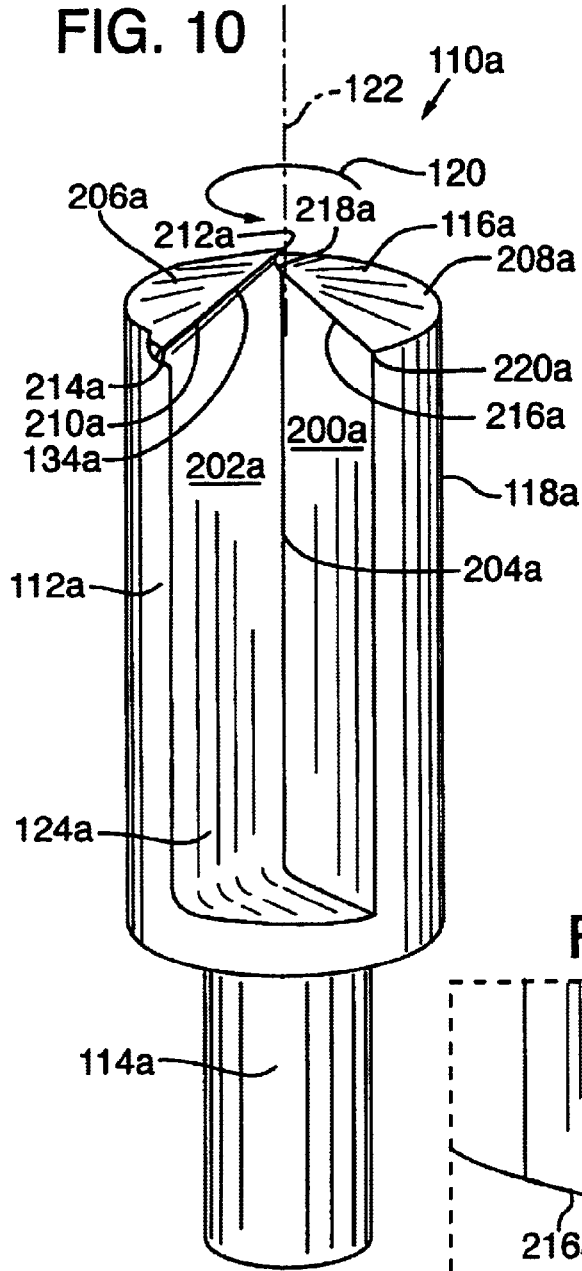
FIG. 10 is a perspective view of an alternative drill bit having a center locator feature in accordance with the invention.
Figure 11:
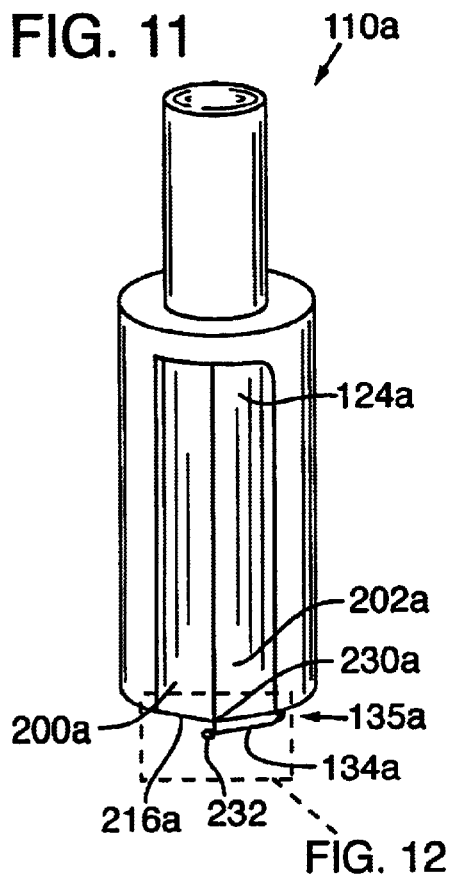
FIG. 11 is a perspective view of the alternative drill bit of FIG. 10 showing its work engaging end operatively positioned so that the axis of rotation of the alternative drill bit is aligned with a desired hole center point.
Figure 12:
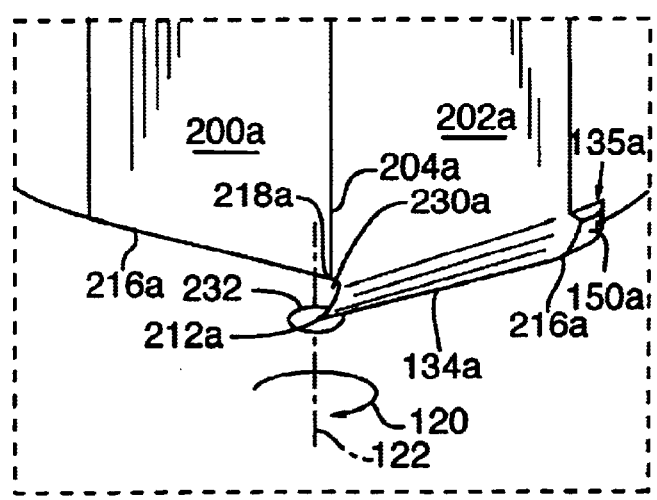
FIG. 12 is an enlarged view of the area confined within the rectangular box drawn around the work engaging end of the alternative drill bit of FIG. 11 and shows the alignment of the axis of rotation of the alternative drill bit and hole center point mark on the work piece.

FIGS. 6, 8, and 9 show drill bit 110 constructed so that its cutting edge 134 lies in a plane that is perpendicular to axis of rotation 122 and engages a work piece to cut a flat-bottomed hole in the work piece. FIGS. 10–12 show an alternative drill bit 110*a* having a work engaging end 116*a* configured to cut in a work piece-a hole having a conical bottom. Components of drill bit 110 and drill bit 110*a* corresponding to each other have identical reference numerals, with the latter components followed by the suffix "a". Cutting tool 110*a* is constructed having work engaging end 216*a* configured so that its cutting edge 134*a* extends in a direction that is transverse to axis of rotation 122 such that medial end 212*a* of cutting edge 134*a* first engages a work piece as cutting tool 110*a* advances into the work piece to cut a hole having a conical bottom.

Having illustrated and described a preferred embodiment of the invention, it will be apparent to those skilled in the art that the invention permits modification in arrangement and detail. The scope of the invention should, therefore, be determined only by the following claims.

What is claimed is:

1. In a cutting tool for removing material from a work piece, the cutting tool of a type having a body adapted for rotation in a predetermined direction about an axis of rotation relative to the work piece and having a driver engaging end and an opposite work engaging end, the work engaging end having first and second portions, the first portion having a first boundary defined by a cutting edge extending in a direction transverse to the axis of rotation and the second portion having a second boundary running in a direction transverse to that of the cutting edge, the cutting edge having medial and distal ends of which the medial end is located nearer to the axis of rotation and the distal end is located nearer to a side surface of the body, the second boundary of the second portion having medial and distal ends of which the medial end is located nearer to the axis of rotation and the distal end is located nearer to the side surface of the body, the improvement comprising:

an opening through which a cutting tool operator can view a punch mark or other indication on the work piece to permit the cutting tool operator to visually place the medial end of the cutting edge at a location where the center of an intended hole is to be located, the opening located between the medial end of the cutting edge and the medial end of the second boundary, and the medial end of the cutting edge positioned at the axis of rotation.

2. The cutting tool of claim 1, further comprising a flute formed within the body, the flute including leading and trailing faces that intersect to define a boundary line that is offset from and extends in a direction along the axis of rotation.

3. The cutting tool of claim 2, in which the trailing face includes a boundary that is defined by the cutting edge and the leading face includes a boundary that is defined by the second boundary.

4. The cutting tool of claim 1, in which the work engaging end has a total area representing a sum of areas of the first and second portions, the area of the first portion being less than the area of the second portion.

5. The cutting tool of claim 1, further comprising a guide projection extending a projection distance beyond the side surface of the body and laterally of the axis of rotation, the guide projection having a guide face that is concentric with the axis of rotation.

6. The cutting tool of claim 5, in which each of the guide projection and the body has a length, the length of the guide projection being substantially shorter than the length of the body.

7. The cutting tool of claim 1, in which the cutting edge lies in a plane that is perpendicular to the axis of rotation and engages the work piece to cut a flat-bottomed hole in the work piece.

8. The cutting tool of claim 1, in which the cutting edge extends in a direction that is transverse to the axis of rotation such that the medial end of the cutting edge first engages the work piece as the cutting tool advances into the work piece to cut a hole having a conical bottom.

9. The cutting tool of claim 1, in which the body comprises a cylindrical shaft having a cylindrical side wall and the cutting edge extends radially at its medial end from the axis to its distal end outwardly of the cylindrical side wall, and in which the work engaging end has a stepped face portion from which the cutting edge is inclined.

10. The cutting tool of claim 1, in which the cutting edge is positioned so that the medial end is never farther away from the driver engaging end than is the distal end and is inclined in a direction away from the driver engaging end so that the cutting edge engages the material to be removed from the work piece to form a finished surface on it.

11. In a cutting tool for removing material from a work piece, the cutting tool of a type having a body adapted for rotation in a predetermined direction about an axis of rotation relative to the work piece and having a driver engaging end and an opposite work engaging end, the work engaging end having first and second portions, the first portion having a first boundary defined by a cutting edge and the second portion having a second boundary running in a direction transverse to that of the cutting edge, the cutting edge having medial and distal ends of which the medial end is located nearer to the axis of rotation and the distal end is located nearer to a side surface of the body, the second boundary of the second portion having medial and distal ends of which the medial end is located nearer to the axis of rotation and the distal end is located nearer to the side surface of the body, the improvement comprising:

an opening through which a cutting tool operator can view a punch mark or other indication on the work piece to permit the cutting tool operator to visually place the medial end of the cutting edge at a location where the center of an intended hole is to be located, the opening located between the medial end of the cutting edge and the medial end of the second boundary, and the medial end of the cutting edge positioned at the axis of rotation; and a total area of the work engaging end representing a sum of areas of the first and second portions, the area of the first portion being less than the area of the second portion.

* * * * *